US009462199B2

(12) United States Patent
Kim et al.

(10) Patent No.: US 9,462,199 B2
(45) Date of Patent: Oct. 4, 2016

(54) IMAGE SENSORS, IMAGE PROCESSING SYSTEMS INCLUDING SAME, AND METHODS OF OPERATING THE SAME

(71) Applicants: Sun Jung Kim, Yongin-si (KR); Kwang Hyun Lee, Hwaseong-si (KR); Seung Hoon Lee, Yongin-si (KR); Ju Hwan Jung, Seoul (KR); Young Gu Jin, Osan-si (KR)

(72) Inventors: Sun Jung Kim, Yongin-si (KR); Kwang Hyun Lee, Hwaseong-si (KR); Seung Hoon Lee, Yongin-si (KR); Ju Hwan Jung, Seoul (KR); Young Gu Jin, Osan-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 175 days.

(21) Appl. No.: 14/051,999

(22) Filed: Oct. 11, 2013

(65) Prior Publication Data

US 2014/0104472 A1    Apr. 17, 2014

Related U.S. Application Data

(60) Provisional application No. 61/713,175, filed on Oct. 12, 2012.

(30) Foreign Application Priority Data

Jun. 24, 2013   (KR) .................. 10-2013-0072612

(51) Int. Cl.
*H04N 5/335*   (2011.01)
*H04N 5/357*   (2011.01)
*H04N 5/378*   (2011.01)

(52) U.S. Cl.
CPC ............. *H04N 5/335* (2013.01); *H04N 5/357* (2013.01); *H04N 5/378* (2013.01)

(58) Field of Classification Search
CPC .. H04N 5/374; H04N 3/1506; H04N 5/3742; H04N 5/3765; H04N 5/217; H04N 5/2173; H04N 5/357; H04N 5/363; H04N 5/365; H04N 5/335; H04N 5/378; G06K 9/40; G06T 2207/20182
See application file for complete search history.

(56) References Cited

U.S. PATENT DOCUMENTS

| | | | | |
|---|---|---|---|---|
| 5,771,070 | A * | 6/1998 | Ohzu et al. | ................. 348/241 |
| 6,344,877 | B1 * | 2/2002 | Gowda et al. | ............... 348/245 |
| 6,670,904 | B1 * | 12/2003 | Yakovlev | ............. H03M 1/144 341/165 |
| 6,831,684 | B1 | 12/2004 | Ewedemi et al. | |
| 6,919,551 | B2 | 7/2005 | Barna et al. | |
| 7,375,748 | B2 | 5/2008 | Krymski | |

(Continued)

FOREIGN PATENT DOCUMENTS

| | | |
|---|---|---|
| JP | 11-205684 | 7/1999 |
| JP | 2005020382 A | 1/2005 |
| JP | 2005252743 A | 9/2005 |

*Primary Examiner* — Aung S Moe
(74) *Attorney, Agent, or Firm* — Harness, Dickey & Pierce, P.L.C.

(57) ABSTRACT

A method of operating an image sensor includes: generating a pixel signal according to intensity of incident light; and generating a digital pixel signal based on a comparison between the pixel signal and at least one reference current. Accordingly, a current output from a 1T pixel in the image sensor is sensed such that the influence of noise is reduced and a pixel signal is sensed more precisely.

25 Claims, 18 Drawing Sheets

(56) References Cited

U.S. PATENT DOCUMENTS

| | | | |
|---|---|---|---|
| 7,488,928 B2 * | 2/2009 | Krymski | H04N 3/155 250/208.1 |
| 7,800,671 B2 | 9/2010 | Segura | |
| 7,943,905 B2 * | 5/2011 | Honda et al. | 250/332 |
| 8,154,640 B2 | 4/2012 | Cha et al. | |
| 8,159,586 B2 * | 4/2012 | Yoshida | H04N 3/1568 348/308 |
| 8,405,747 B2 * | 3/2013 | Mo et al. | 348/245 |
| 8,493,490 B2 * | 7/2013 | Sato | 348/308 |
| 8,717,471 B2 * | 5/2014 | Sato | H04N 5/3742 348/294 |
| 8,975,569 B2 * | 3/2015 | Yamazaki | 250/208.1 |
| 2001/0012070 A1 * | 8/2001 | Enod et al. | 348/302 |
| 2004/0041080 A1 * | 3/2004 | Barna et al. | 250/214 R |
| 2007/0273785 A1 * | 11/2007 | Ogawa et al. | 348/362 |
| 2008/0251721 A1 * | 10/2008 | Ueno | 250/332 |
| 2009/0072120 A1 * | 3/2009 | McGarry et al. | 250/208.1 |
| 2009/0086067 A1 * | 4/2009 | Araki et al. | 348/294 |
| 2009/0194698 A1 * | 8/2009 | Onakado et al. | 250/338.1 |
| 2010/0079611 A1 * | 4/2010 | Suzuki | H04N 5/374 348/222.1 |
| 2010/0110257 A1 * | 5/2010 | Hiyama et al. | 348/308 |
| 2010/0128148 A1 | 5/2010 | Yamauchi | |
| 2011/0050969 A1 * | 3/2011 | Nishihara | 348/296 |
| 2011/0074994 A1 * | 3/2011 | Wakabayashi et al. | 348/302 |
| 2011/0090374 A1 * | 4/2011 | Huang | H04N 5/343 348/241 |
| 2011/0279723 A1 * | 11/2011 | Takamiya et al. | 348/308 |
| 2012/0286138 A1 * | 11/2012 | Yamazaki | 250/208.1 |
| 2012/0286139 A1 * | 11/2012 | Tashiro et al. | 250/208.1 |
| 2014/0027617 A1 * | 1/2014 | Amikawa | 250/208.1 |
| 2014/0092287 A1 * | 4/2014 | Jin et al. | 348/301 |
| 2014/0103191 A1 * | 4/2014 | Jung et al. | 250/208.1 |
| 2014/0104472 A1 * | 4/2014 | Kim et al. | 348/302 |
| 2014/0104473 A1 * | 4/2014 | Kim et al. | 348/308 |
| 2015/0162373 A1 * | 6/2015 | Kim et al. | 257/13 |

* cited by examiner

FIG. 6

| Cases | DPS | |
|---|---|---|
| | MSB | LSB |
| PS_COL1 < Iref1 | 0 | 0 |
| Iref1 < PS_COL1 < Iref2 | 0 | 1 |
| Iref2 < PS_COL1 < Iref3 | 1 | 0 |
| Iref3 < PS_COL1 | 1 | 1 |

IMAGE SENSORS, IMAGE PROCESSING SYSTEMS INCLUDING SAME, AND METHODS OF OPERATING THE SAME

CROSS-REFERENCE TO RELATED APPLICATIONS

This application claims priority under 35 U.S.C. §119 to U.S. Provisional Patent Application 61/713,175 filed on Oct. 12, 2012, and to Korean Patent Application No. 10-2013-0072612 filed on Jun. 24, 2013, the entire contents of each of which are hereby incorporated by reference.

BACKGROUND

1. Field

Example embodiments of inventive concepts relate to image sensors, image processing systems including the same, and methods of operating the same, and more particularly, to image sensors for more accurately and/or quickly sensing a pixel signal of a 1T pixel, image processing systems including the same, and methods of operating the same.

2. Description of Conventional Art

An image sensor is a device that converts an optical image into an electrical signal. The image sensor includes a plurality of pixels. When each of the pixels includes a transfer transistor, a reset transistor, a selection transistor, and a source follower transistor, each pixel is referred to as a 4T pixel.

With the development of technology, the size of pixels has decreased. For instance, instead of 4T pixels, pixels with a single transistor (1T pixels) have been developed. However, detailed sensing methods of image sensors including 1T pixels are not known.

SUMMARY

At least one example embodiment provides method of operating an image sensor, the method comprising: generating a pixel signal according to an intensity of incident light; and generating a digital pixel signal based on a comparison between the pixel signal and at least one reference current.

The method may further include generating the at least one reference current according to a reference voltage.

The generating the digital pixel signal may include: comparing the pixel signal with the at least one reference current; and generating the digital pixel signal based on a result of the comparison, the digital pixel signal having at least one bit.

The method may further include removing noise from the pixel signal and the at least one reference current.

The generating the pixel signal may include: removing photogenerated charges from a photodiode; accumulating photogenerated charges corresponding to the intensity of the incident light on the photodiode; and generating the pixel signal corresponding to the accumulated photo generated charges.

At least one other example embodiment provides an image sensor including: a cell array including a plurality of pixels and a plurality of reference cells, each of the plurality of pixels being configured to generate a pixel signal according to intensity of incident light, and each of the plurality of reference cells being configured to generate a reference current according to a reference voltage; and a readout block configured to compare the pixel signal with the reference current, and to generate a digital pixel signal based on a result of the comparison.

Each of the plurality of pixels may include a single transistor and a photodiode.

Each of the plurality of pixels may be configured to: remove photogenerated charges from the photodiode; accumulate photogenerated charges corresponding to the intensity of the incident light on the photodiode; and generate the pixel signal corresponding to the accumulated photo generated charges.

Each of the plurality of reference cells may not include a photodiode.

The image sensor may further include a row driver configured to generate a gate signal and the reference voltage to control an operation of the cell array.

The cell array further may further include: a plurality of ranks, each of the plurality of ranks including a portion of the plurality of pixels.

The plurality of ranks may be controlled independently of each other according to different gate signals. The plurality of reference cells may correspond to one of the plurality of ranks. The plurality of reference cells corresponding to one of the plurality of ranks may receive the same reference voltage or different reference voltages.

The readout block may include: a readout circuit configured to compare the pixel signal with the reference current, and to generate the digital pixel signal based on a result of the comparison; and an output circuit configured to temporarily store, amplify and output the digital pixel signal. The readout circuit may include: a plurality of sub-readout circuits, each of the plurality of sub-readout circuits corresponding to a column of the cell array, and each of the plurality of sub-readout circuits being configured to be activated according to a corresponding column selection signal; and a reference current circuit configured to remove noise from the reference current, and to output the reference current to the readout circuits.

Each of the plurality of sub-readout circuits may include: a switching block configured to control a flow of the pixel signal and the reference current according to the corresponding column selection signal; a comparison block configured to compare the pixel signal with the reference current, and to generate a digital comparison signal; and a decoding block configured to generate the digital pixel signal based on the digital comparison signal, the digital pixel signal having at least one bit.

Each the plurality of sub-readout circuits may further include a replica block configured to replicate the pixel signal to generate at least one replica pixel signal.

The image sensor may further include: a column driver configured to generate a column selection signal for controlling an operation of the readout block; and a timing generator configured to control an operation of the column driver.

At least one other example embodiment provides an image processing system including: an image sensor configured to compare a pixel signal with a reference current, and to generate a digital pixel signal based on a result of the comparison, the pixel signal being generated according to intensity of incident light, and the reference current being generated according to a reference voltage; and an image signal processor configured to generate image data by processing the digital pixel signal.

The image sensor may include: a plurality of pixels, each of the plurality of pixels being configured to generate a corresponding pixel signal; and a plurality of reference cells, each of the plurality of reference cells being configured to generate a reference current.

Each of the plurality of pixels may include a single transistor and a photodiode. Each of the plurality of reference cells may not include a photodiode.

At least one other example embodiment provides an image sensor including: a cell array including a plurality of pixels and a plurality of reference cells, each of the plurality of pixels being configured to generate a pixel signal according to intensity of incident light, and each of the plurality of reference cells being configured to generate a reference current according to a reference voltage; and a readout block configured to generate digital pixel signals based on comparisons between the pixel signals and the reference currents; wherein the plurality of pixels are arranged in a plurality of ranks, the plurality of ranks being configured to operate independently from each other according to different control signals.

At least one other example embodiment provides an image sensor including: a cell array including a plurality of pixels configured to generate pixel signals based on intensity of incident light, the plurality of pixels being arranged in a plurality of rows and a plurality of columns, the plurality of columns of pixels being organized into a plurality of groups of adjacent columns of pixels, each of the plurality of groups of adjacent columns of pixels being controlled independently from each other based on respective sets of control signals.

The image sensor may further include: a readout block configured to generate digital pixel signals based on comparisons between the pixel signals and at least one reference current.

The readout block may include a readout circuit. The readout circuit may include: a reference current circuit configured to remove noise from the at least one reference current, and output the at least one reference current; and a plurality of sub-readout circuits, each of the plurality of sub-readout circuits corresponding to a group of adjacent columns from among the plurality of groups of adjacent columns, and each of the plurality of sub-readout circuits being configured to generate a digital pixel signal based on a comparison between the at least one reference current and a pixel signal output from a column among a corresponding group of adjacent columns.

Each of the plurality of pixels may include: a single transistor and a photodiode. The image sensor may further include: a readout block configured to generate a digital pixel signal corresponding to each pixel signal based on comparisons between the pixel signals and a plurality of reference currents, the plurality of reference currents being generated based on a plurality of different reference voltages.

BRIEF DESCRIPTION OF THE DRAWINGS

The above and other features and advantages of inventive concepts will become more apparent by describing in detail example embodiments thereof with reference to the attached drawings in which:

FIG. 6 is a diagram for explaining an example embodiment of a method of generating a digital pixel signal using the sub-readout circuit illustrated in FIG. 5;

DETAILED DESCRIPTION

Figure 1:
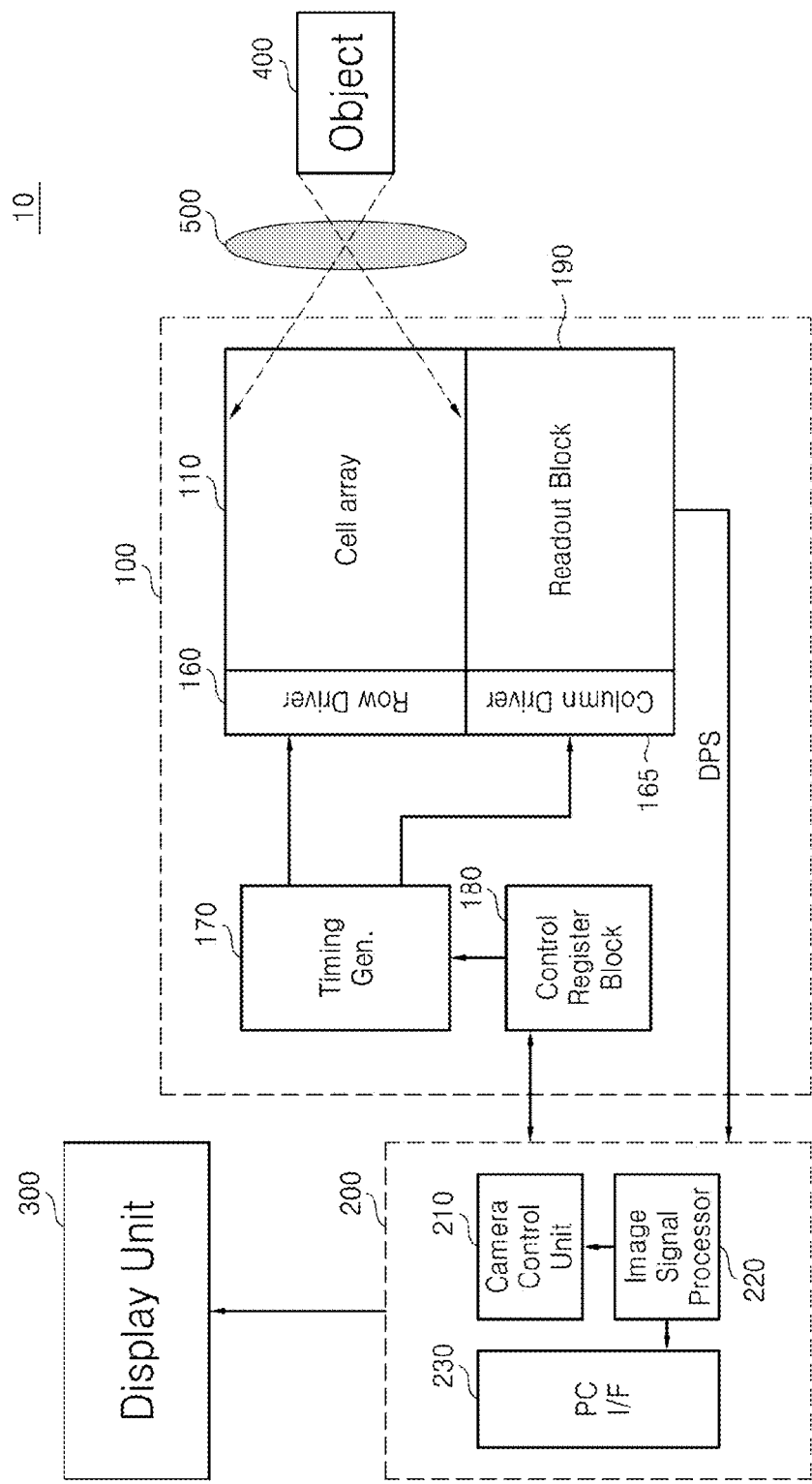
FIG. 1 is a block diagram of an image processing system according to an example embodiment of inventive concepts.

Inventive concepts now will be described more fully hereinafter with reference to the accompanying drawings, in which, some example embodiments are shown. Inventive concepts may, however, be embodied in many different forms and should not be construed as limited to the example embodiments set forth herein. Rather, these example embodiments are provided so that this disclosure will be thorough and complete, and will fully convey the scope of inventive concepts to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of inventive concepts. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of an image processing system 10 according to an example embodiment of inventive concepts. The image processing system 10 may include an image sensor 100, a digital signal processor (DSP) 200, a display unit (or circuit) 300, and a lens 500.

The image sensor 100 may include a cell array 110, a row driver 160, a column driver 165, a timing generator 170, a control register block 180, and a readout block 190. The image sensor 100 may be controlled by the DSP 200 to sense an object 400 captured through the lens 500. The DSP 200 may output an image, which has been sensed and output by the image sensor 100, to the display unit 300. The display unit 300 may be any device that can output an image. For instance, the display unit 300 may be implemented as a computer, a mobile phone, or any type of image display terminal.

The DSP 200 may include a camera control unit 210, an image signal processor (ISP) 220, and a personal computer interface (PC I/F) 230. The camera control unit 210 controls the control register block 180. The camera control unit 210 may control the image sensor 100, and more specifically, the control register block 180 using an inter-integrated circuit ($I^2C$), but the scope of the inventive concept is not restricted thereto.

The ISP 220 processes a digital pixel signal DPS output from the readout block 190 into image data nice for people to look at and outputs the image data to the display unit 300 through the PC I/F 230. The ISP 220 is implemented in a separate chip from the image sensor 100. In other example embodiments, the ISP 220 and the image sensor 100 may be implemented together in a single chip.

The cell array 110 may include a plurality of pixels generating a pixel signal corresponding to the intensity of incident light and a plurality of reference cells generating a reference current corresponding to a reference voltage. Each of the pixels includes a single transistor and a photoelectric conversion element. The photoelectric conversion element may be a photo diode or a pinned photo diode.

Each pixel includes only one single transistor, thereby increasing the degree of integration of the image sensor 100. For instance, the image sensor 100 may include pixels having a size of about 0.1×0.1 µm or less. The cell array 110 senses light using a plurality of photoelectric conversion elements and converts the light into an electrical signal to generate a pixel signal. Meanwhile, each of the reference cells includes only a single transistor without a photoelectric conversion element.

The cell array 110 may include a plurality of banks (Rank1 through Rank4 in FIG. 2) each including some of the pixels. Some of the reference cells may correspond to one of the ranks.

The timing generator 170 may apply a control signal or a clock signal to the row driver 160 and the column driver 165 to control the operations or the timing of the row driver 160 and the column driver 165. The control register block 180 is controlled by the camera control unit 210 and stores various commands necessary for the operation of the image sensor 100.

The row driver 160 drives each rank of the cell array 110 in row units. In detail, pixels in one row in one of the ranks may be provided with the same gate signal and pixels in one row in the cell array 110 may be provided with different gate signals by ranks. In other words, the row driver 160 may decode a control signal output from the timing generator 170 and provide a gate signal for each row of each rank in the cell array 110.

The cell array 110 outputs a pixel signal from a row selected by the gate signal provided from the row driver 160 to the readout block 190. The reference cells in the cell array 110 may generate a reference current according to a reference voltage provided from the row driver 160 and output the reference current to the readout block 190.

The column driver 165 may generate a column selection signal according to the control of the timing generator 170, thereby controlling the operation of the readout block 190. The readout block 190 compares the pixel signal with the reference current and outputs the digital pixel signal DPS to the DSP 200 based on the comparison result.

Figure 2:
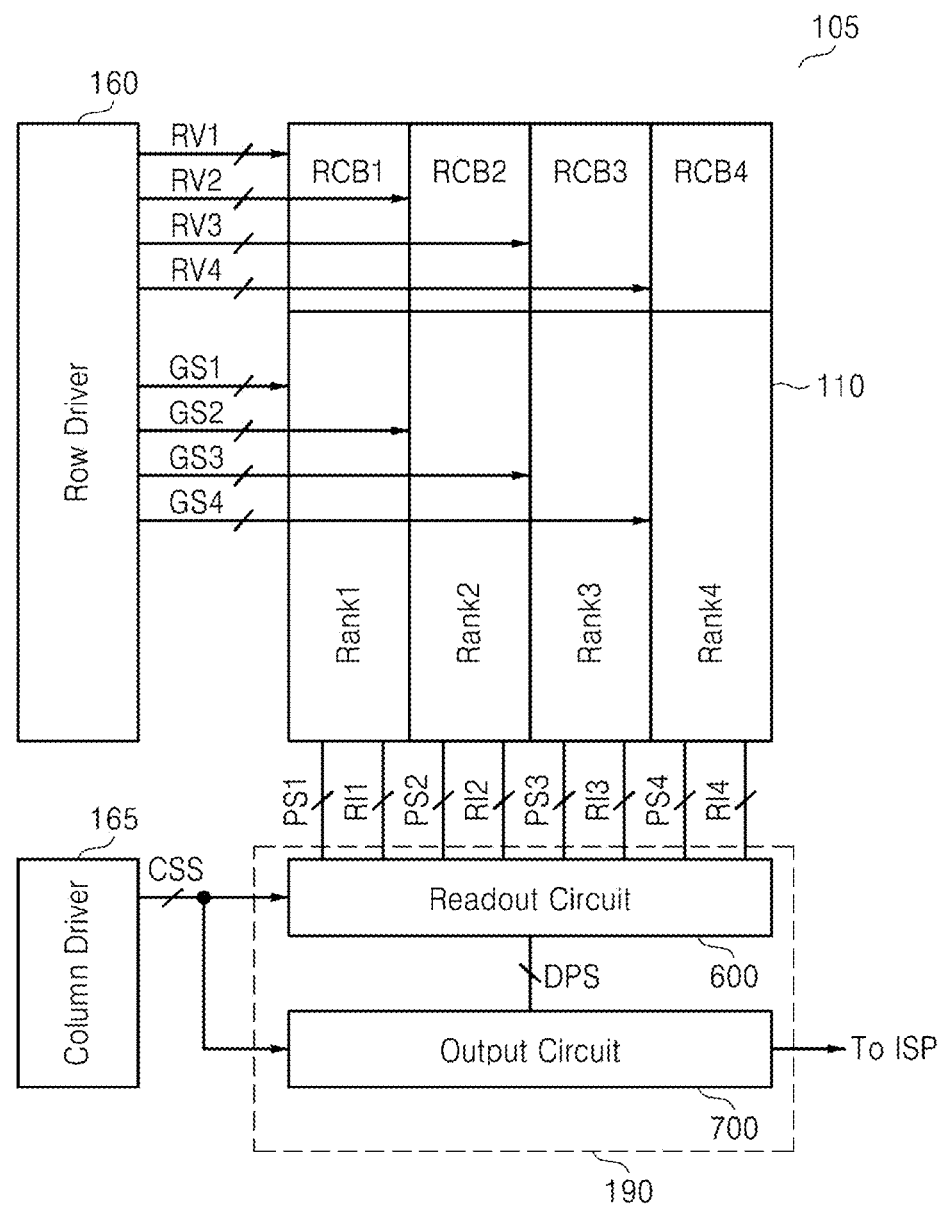
FIG. 2 is a block diagram for explaining example operation of the image sensor illustrated in FIG. 1.

FIG. 2 is a block diagram for explaining example operation of the image sensor 100 illustrated in FIG. 1. Referring to FIGS. 1 and 2, a part 105 of the image sensor 100 illustrated in FIG. 1 is illustrated in FIG. 2. The cell array 110 may include a plurality of ranks Rank1 through Rank4 and a plurality of reference cell blocks RCB1 through RCB4 respectively corresponding to the ranks Rank1 through Rank4.

The ranks Rank1 through Rank4 may receive different gate signal groups GS1 through GS4, respectively, from the row driver 160. Each of the gate signal groups GS1 through GS4 may include a plurality of gate signals (e.g., VG1 through VGn in FIG. 3) respectively corresponding to a plurality of rows. Accordingly, the ranks Rank1 through Rank4 may be differently controlled from one another according to the gate signal groups GS1 through GS4, respectively.

The reference cell blocks RCB1 through RCB4 may receive different reference voltage groups RV1 through RV4, respectively, from the row driver 160. Each of the reference voltage groups RV1 through RV4 may include at least one gate signal (e.g., Vref in FIG. 3) corresponding to reference cells. Accordingly, the reference cell blocks RCB1 through RCB4 may be differently controlled from one another according to the reference voltage groups RV1 through RV4, respectively.

The readout block 190 may include a readout circuit 600 and an output circuit 700. The readout circuit 600 may compare pixel signal groups PS1 through PS4 respectively output from the ranks Rank1 through Rank4 with reference current groups RI1 through RI4 respectively output from the ranks Rank1 through Rank4 in response to a column selection signal CSS and generate the digital pixel signal DPS based on the comparison result. The output circuit 700 may temporarily store the digital pixel signal DPS in response to the column selection signal CSS and amplify and output the digital pixel signal DPS to the ISP 220.

Figure 3:
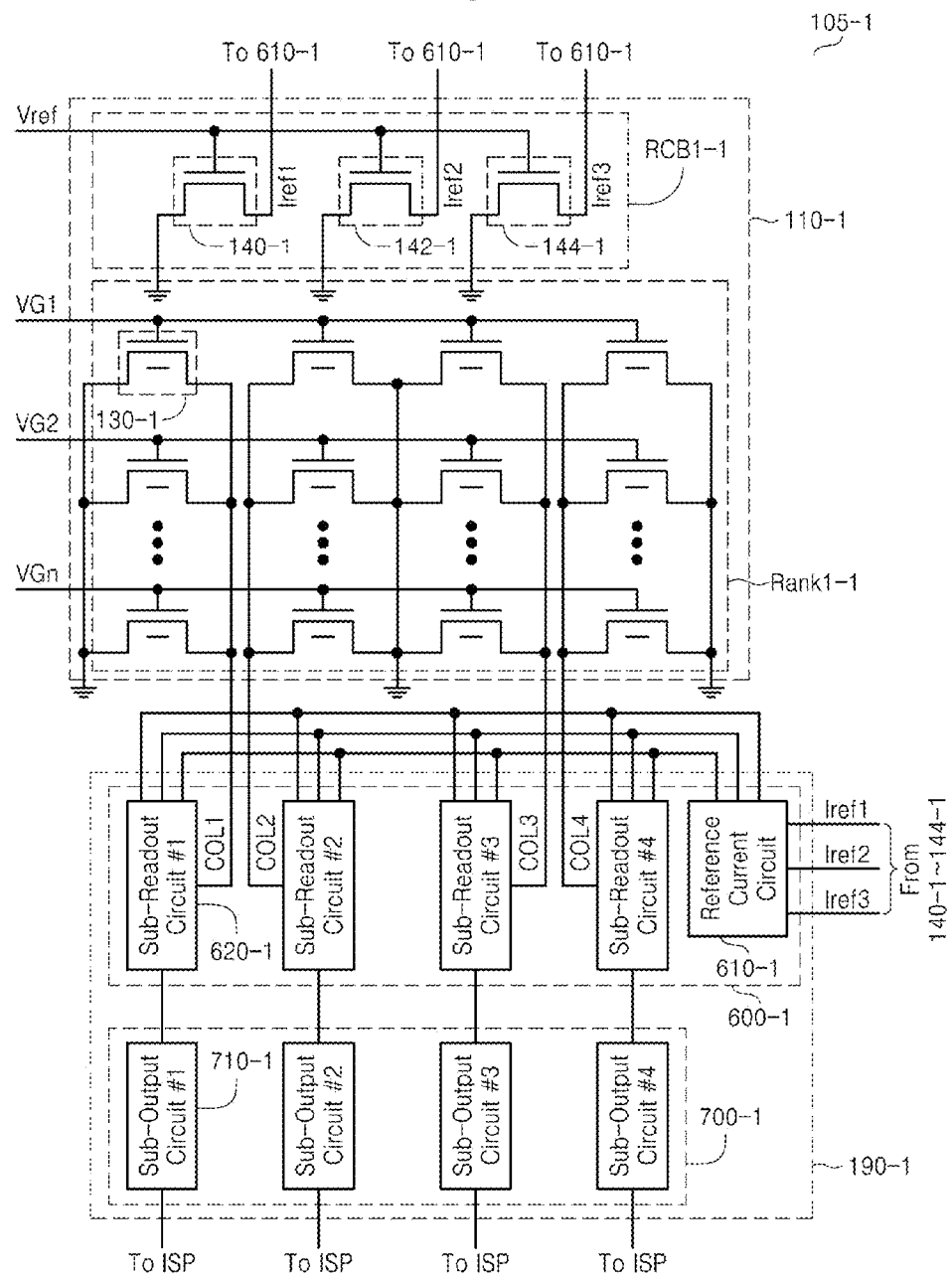
FIG. 3 is a block diagram for explaining example operation of a part of the image sensor illustrated in FIG. 2 according to an example embodiment of inventive concepts.

FIG. 3 is a block diagram for explaining example operation of an example of the part 105 of the image sensor 100 illustrated in FIG. 2. Referring to FIGS. 1 through 3, the example of the part 105 of the image sensor 100, i.e., a part 105-1 includes a cell array 110-1 and a readout block 190-1. For convenience sake in the description, only a first rank Rank1-1 of the cell array 110-1 will be described. The operations of the second through fourth ranks Rank2 through Rank4 may be substantially the same as those of the first rank Rank1-1. The cell array 110-1 includes the first rank Rank1-1 and a first reference cell block RCB1-1 corresponding to the first rank Rank1-1.

The first rank Rank1-1 includes a plurality of pixels 130-1 arranged in a matrix form and has "n" rows and four columns, but the scope of the inventive concept is not restricted thereto. Each of the pixels 130-1 may include a single transistor and a photodiode.

A source terminal of the single transistor may be connected to a ground. A gate terminal of the single transistor may be connected to the row driver 160 to receive a gate signal corresponding to a current row among the gate signals VG1 through VGn of the first gate signal group GS1. In other words, pixels 130-1 in one row of the first rank Rank1-1 may receive the same gate signal. A drain terminal of the single transistor is connected to a sub-readout circuit 620-1 through one of column lines COL1 through COL4 to output a pixel signal. In other words, pixel signals respectively output through the column lines COL1 through COL4 may make up the first pixel signal group PS1 shown in FIG. 2. The operation of the pixels 130-1 will be described in detail with reference to FIG. 7 later.

The first reference cell block RCB1-1 may include first through third reference cells 140-1, 142-1, and 144-1, each of which may include a transistor. A source terminal of the transistor may be connected to the ground. A gate terminal of the transistor may be connected to the row driver 160 to receive the reference voltage Vref. The reference voltage Vref may correspond to the first reference voltage group RV1 shown in FIG. 2. The transistor may have a different channel width-to-length ratio (W/L). For instance, the first reference cell 140-1 may have the lowest W/L and the third reference cell 144-1 may have the highest W/L. Therefore, when the same reference voltage Vref is applied to the transistors of the reference cells 140-1 through 144-1, a reference current Iref1 of the first reference cell 140-1 has the lowest value and the a reference current Iref3 of the third reference cell 144-1 has the highest value. Drain terminals of the respective transistors may be connected to a reference current circuit 610-1 to output the reference currents Iref1 through Iref3, respectively.

The readout block 190-1 includes a readout circuit 600-1 and an output circuit 700-1. The readout circuit 600-1 includes the reference current circuit 610-1 and a plurality of sub-readout circuits 620-1. The reference current circuit 610-1 removes noise from the reference currents Iref1 through Iref3 and amplifies and provides the reference currents Iref1 through Iref3 to the sub-readout circuits 620-1 when necessary. The reference current circuit 610-1 may include a noise rejection filter and an amplifier.

The sub-readout circuits 620-1 may be implemented to respectively correspond to columns of the cell array 110-1. Each of the sub-readout circuits 620-1 may be activated in response to the column selection signal CSS to compare the reference currents Iref1 through Iref3 with a pixel signal received through one of the column lines COL1 through COL4 and generate the digital pixel signal DPS.

The output circuit 700-1 may include sub-output circuits 710-1 respectively corresponding to the sub-readout circuits 620-1 to temporarily store the digital pixel signal DPS in response to the column selection signal CSS and amplify and output the digital pixel signal DPS to the ISP 220. Alternatively, the output circuit 700-1 may include a volatile memory (e.g., static random access memory (SRAM)) (not shown) temporarily storing the digital pixel signal DPS and a buffer (not shown) amplifying and outputting the digital pixel signal DPS. The output circuit 700-1 may also include a counter (not shown) adding up digital pixel signals DPS of a predetermined number of rows.

Figure 4:
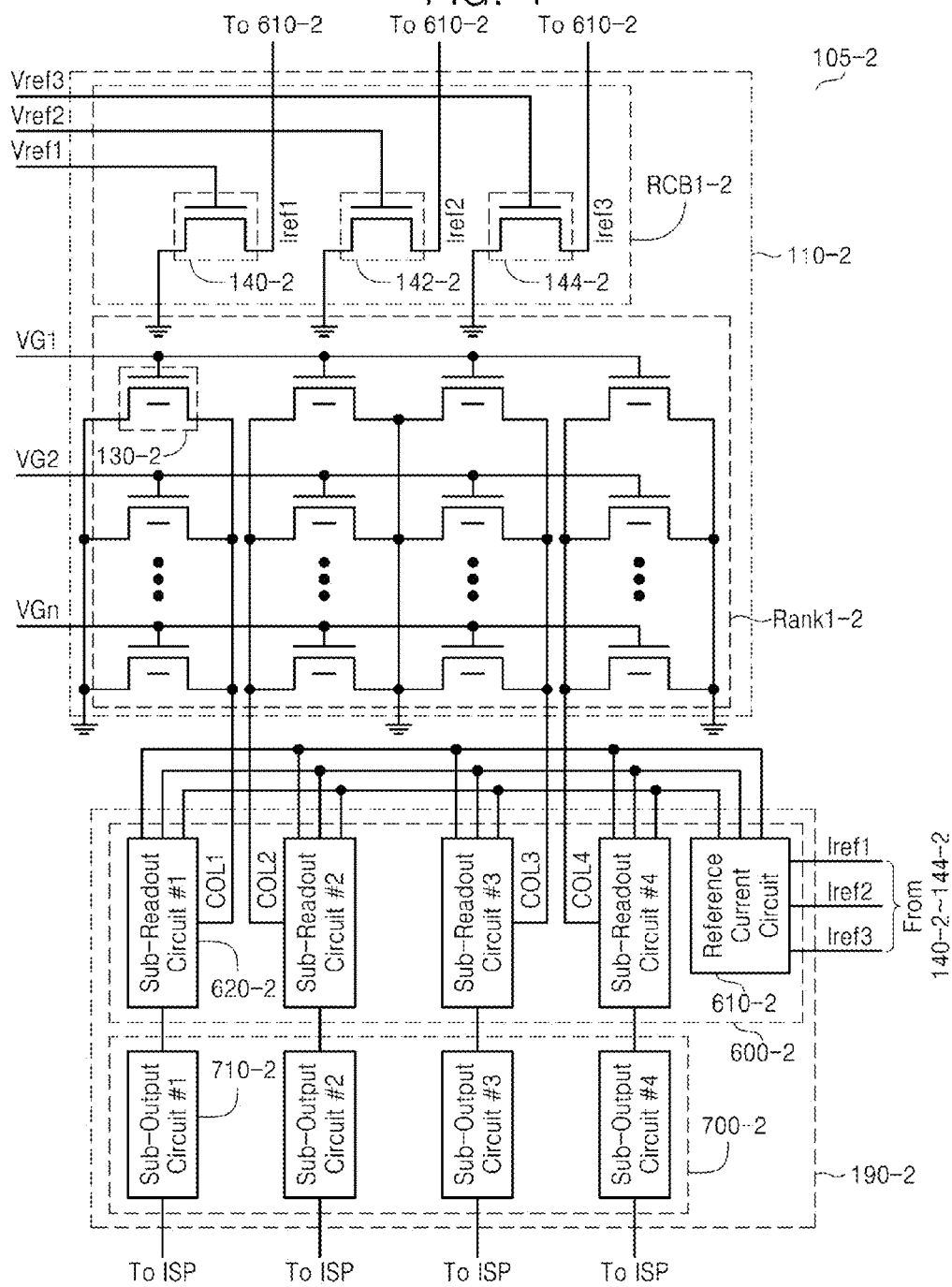
FIG. 4 is a block diagram for explaining example operation of a part of the image sensor illustrated in FIG. 2 according to another example embodiment of inventive concepts.

FIG. 4 is a block diagram for explaining example operations of another example of the part 105 of the image sensor 100 illustrated in FIG. 2. Referring to FIGS. 1 through 4, the example of the part 105 of the image sensor 100, i.e., a part 105-2 includes a cell array 110-2 and a readout block 190-2. The part 105-2 illustrated in FIG. 4 is substantially the same as the part 105-1 illustrated in FIG. 3 except for some differences, and therefore, the differences will be mainly described.

A first reference cell block RCB1-2 may include first through third reference cells 140-2, 142-2, and 144-2. A gate terminal of a transistor included in each of the first through third reference cells 140-2 through 144-2 may be connected to the row driver 160 to receive a different reference voltage Vref1, Vref2, or Vref3. The reference voltages Vref1 through Vref3 may make up the first reference voltage group RV1 shown in FIG. 2.

The first reference voltage Vref1 may have the lowest value and the third reference voltage Vref3 may have the highest value. At this time, the reference current Iref1 of the first reference cell 140-2 has the lowest value and the reference current Iref3 of the third reference cell 144-2 has the highest value. The transistors of the reference cells 140-2 through 144-2 may have the same W/L.

Figure 5:
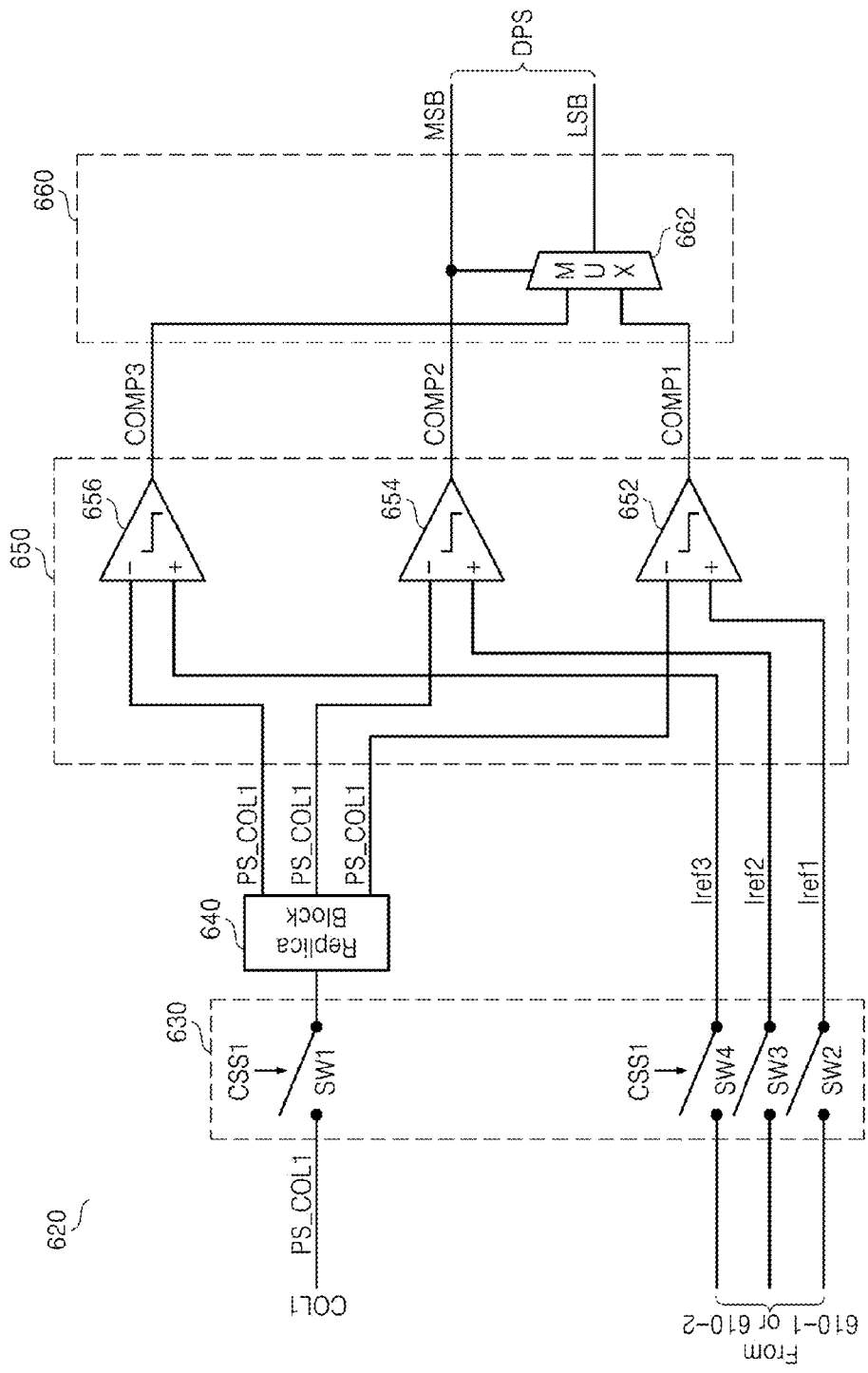
FIG. 5 is a diagram of a sub-readout circuit illustrated in FIGS. 3 and 4 according to an example embodiment of inventive concepts.

FIG. 5 is a diagram of an example embodiment of the sub-readout circuits 620-1 and 620-2 illustrated in FIGS. 3 and 4. FIG. 6 is a diagram for explaining an example embodiment of a method of generating the digital pixel signal DPS using a sub-readout circuit 620 illustrated in FIG. 5. Referring to FIGS. 1 through 6, the sub-readout circuit 620 is connected to the first column line COL1. The sub-readout circuit 620 may include a switching block 630, a replica block 640, a comparison block 650, and a decoding block 660.

The switching block 630 may include first through fourth switches SW1 through SW4. The first switch SW1 may control the flow of a pixel signal PS_COL1 output from the first column line COL1 according to a first column selection signal CSS1 between the first column line COL1 and the replica block 640. For instance, when the first column selection signal CSS1 is at a high level, the first switch SW1 may allow the pixel signal PS_COL1 to be transmitted to the replica block 640. When the first column selection signal CSS1 is at a low level, the first switch SW1 may cut off the pixel signal PS_COL1.

The second through fourth switches SW2 through SW4 may control the first through third reference currents Iref1 through Iref3, respectively, between the reference current circuit 610-1 or 610-2 shown in FIG. 3 or 4 and the comparison block 650. For instance, when the first column selection signal CSS1 is at the high level, the second through fourth switches SW2 through SW4 may respectively allow the reference currents Iref1 through Iref3 to be transmitted to the comparison block 650. When the first column selection signal CSS1 is at the low level, the second through fourth switches SW2 through SW4 may respectively cut off the reference currents Iref1 through Iref3.

The replica block 640 may replicate the pixel signal PS_COL1 as many as the number of comparators 652, 654, and 656 included in the comparison block 650 or the number of reference currents Iref1 through Iref3 to generate replica pixel signals PS_COL1. The replica block 640 may be implemented using a plurality of current mirrors, but the inventive concept is not restricted thereto. The replica block 640 may include a noise filter (not shown) removing noise from the pixel signal PS_COL1.

The comparison block 650 may include a plurality of the comparators 652 through 656 respectively corresponding to the reference currents Iref1 through Iref3. The comparators 652 through 656 may compare the pixel signal PS_COL1 with the reference currents Iref1 through Iref3, respectively, to generate digital comparison signals COMP1 through COMP3, respectively. For instance, the first comparator 652 may generate the comparison signal COMP1 at a high level (e.g., of "1") when the current level of the pixel signal PS_COL1 is higher than that of the first reference current Iref1 and it may generate the comparison signal COMP1 at a low level (e.g., of "0") in otherwise cases.

The decoding block 660 may generate the digital pixel signal DPS having at least one bit (e.g., a most significant bit (MSB) and a least significant bit (LSB)) based on the comparison signals COMP1 through COMP3. The decoding block 660 may include a multiplexer (MUX) 662 that outputs the first comparison signal COMP1 or the third comparison signal COMP3 in response to the second comparison signal COMP2. For instance, the MUX 662 may output the third comparison signal COMP3 when the second comparison signal COMP2 is at a high level and may output the first comparison signal COMP1 when the second comparison signal COMP2 is at a low level.

The first bit, e.g., the MSB of the digital pixel signal DPS is determined by the second comparison signal COMP2 of the second comparator 654 and the second bit, e.g., the LSB of the digital pixel signal DPS is determined by an output of the MUX 662.

Referring to FIG. 6, it is assumed that the first reference current Iref1 has the lowest current level and the third reference current Iref3 has the highest current level. When the current level of the pixel signal PS_COL1 is lower than that of the first reference current Iref1, the first bit MSB is 0 the same as the second comparison signal COMP2 and the second bit LSB is 0 the same as the first comparison signal COMP1 as the MUX 662 outputs the first comparison signal COMP1.

When the current level of the pixel signal PS_COL1 is between the current level of the first reference current Iref1 and the current level of the second reference current Iref2, the first bit MSB is 0 the same as the second comparison signal COMP2 and the second bit LSB is 1 the same as the first comparison signal COMP1 as the MUX 662 outputs the first comparison signal COMP1.

When the current level of the pixel signal PS_COL1 is between the current level of the second reference current Iref2 and the current level of the third reference current Iref3, the first bit MSB is 1 the same as the second comparison signal COMP2 and the second bit LSB is 0 the same as the third comparison signal COMP3 as the MUX 662 outputs the third comparison signal COMP3.

When the current level of the pixel signal PS_COL1 is higher than that of the third reference current Iref3, the first bit MSB is 1 the same as the second comparison signal COMP2 and the second bit LSB is 1 the same as the third comparison signal COMP3 as the MUX 662 outputs the third comparison signal COMP3.

Although a case where there are three reference currents Iref1 through Iref3 and a pixel signal is converted into a digital pixel signal having two bits has been described as an example, the inventive concept is not restricted to this example. For instance, there may be only one reference current and the digital pixel signal may have only one bit or there may be seven reference currents and the distal pixel signal may have three bits.

Figure 7:
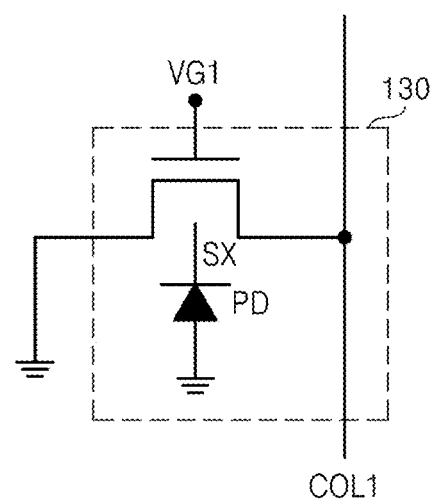
FIG. 7 is a detailed block diagram of an example embodiment of a pixel illustrated in FIG. 3 or 4.

FIG. 7 is a detailed block diagram of an example embodiment of a pixel 130 illustrated in FIG. 3 or 4. Referring to FIGS. 1 through 4 and FIG. 7, the pixel 130 may include a single transistor SX and a photodiode PD. For clarity of the description, it is assumed that a photoelectric conversion element is the photodiode PD in the current embodiments, but the inventive concept is not restricted to these embodiments. The pixel 130 corresponds to the pixel 130-1 illustrated in FIG. 3 or the pixel 130-2 illustrated in FIG. 4. The structure and operations of the pixel 130 apply to the other pixels included in the cell array 110.

The photodiode PD has a first end connected to the ground and a second end that may be connected to or electrically disconnected from the body of the single transistor SX. The photodiode PD may retain charges generated in proportion to the intensity of light input through the lens 500.

A gate of the single transistor SX may be connected to the row driver 160 to receive the gate signal VG1. A source of the single transistor SX may be connected to the ground.

The pixel 130 may perform three operations, e.g., an integration operation, a reset operation, and a readout operation according to the gate signal VG1. For instance, when the single transistor SX is implemented as a P-type metal oxide semiconductor (PMOS), the gate signal VG1 may have a negative voltage level for the reset operation and a positive voltage level for the integration operation. The gate signal VG1 for the readout operation may have a positive voltage level higher than the positive voltage level for the integration operation.

In the integration operation, among charges (electrons and holes) generated by incident light, one type of charges (electrons or holes) are accumulated in the photodiode PD. In the reset operation, the photogenerated charges accumulated in the photodiode PD are drained through a source of a drain.

In the readout operation, the pixel signal PS_COL1 corresponding to the photogenerated charges accumulated in the photodiode PD is output through the first column line COL1. The pixel signal PS_COL1 includes an image signal and a reset signal. The image signal is a signal output in the readout operation right after the integration operation and the reset signal is a signal output in the readout operation right after the reset operation. For convenience' sake, the readout operation in which the reset signal is output will be omitted.

In the readout operation, the body voltage of the signal transistor SX may be different depending on photogenerated charges accumulated in the photodiode PD. The threshold voltage of the single transistor SX may vary with the body voltage. When the threshold voltage of the single transistor SX changes, the same result as obtained when a source voltage changes can be obtained. By using this principle, the pixel 130 may output a pixel signal having at least two levels in a digital format.

Figure 8:
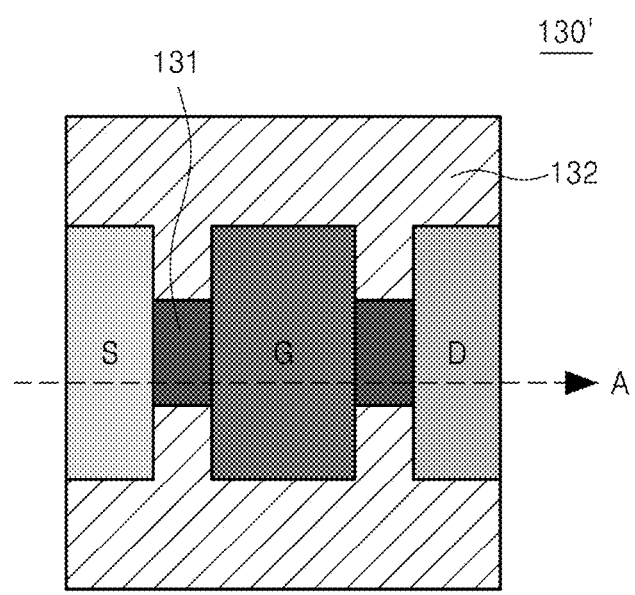
FIG. 8 is a diagram of an example layout of the pixel illustrated in FIG. 7.

FIG. 8 is a diagram of an example layout 130' of the pixel 130 illustrated in FIG. 7. Referring to FIGS. 7 and 8, in the layout 130', a source S, a gate G, and a drain D of a single transistor are sequentially formed and a channel 131 connecting the source S and the drain D is formed. In addition, a well layer 132 for electrical isolation from adjacent pixels (not shown) may be included in the layout 130'.

Although not shown, a shallow trench isolation (STI) for electrical isolation from a pixel adjacent in the direction A or B may be included in the layout 130'. Reference cells, e.g., 140-1 shown in FIG. 3 or 4, may be implemented in the structures illustrated in FIGS. 8 through 11 but may not include a photodiode 133.

Figure 9:
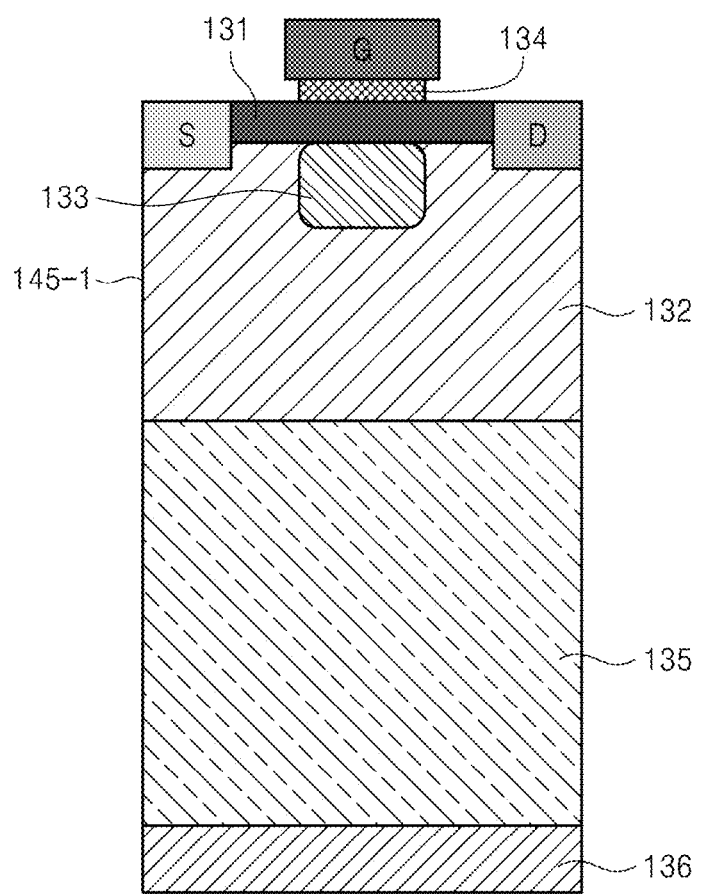
FIG. 9 is a diagram of a cross-section of a semiconductor substrate taken along the direction A in the layout illustrated in FIG. 8 according to an example embodiment of inventive concepts.

FIG. 9 is a diagram of a cross-section 130A-1 of a semiconductor substrate 145-1 taken along the direction A in the layout 130' illustrated in FIG. 8 according to an example embodiment of inventive concepts. Referring to FIGS. 8 and 9, the cross-section 130A-1 of the semiconductor substrate 145-1 may include the source S, gate G and drain D of a single transistor, the channel 131, the well layer 132, the photodiode 133, a gate insulating layer 134, a first epitaxial layer 135, and a second epitaxial layer 136. The semiconductor substrate 145-1 may be formed based on a silicon (Si) substrate.

The source S, gate G and drain D of the single transistor may function as the terminals of the single transistor. The source S and the drain D may be formed as a high-concentration doped region using ion implantation. When the single transistor is a PMOS transistor, the source S and the drain D may be a P region doped with P+ type impurities. Contrarily, when the single transistor is an N-type metal oxide semiconductor (NMOS) transistor, the source S and the drain D may be an N region doped with N+ type impurities. The gate G may be formed using poly silicon.

The channel 131 may be formed to smooth the flow of carriers between the source S and the drain D of the single transistor. The carriers are holes when the single transistor is a PMOS transistor and they are electrons when the single transistor is an NMOS transistor. The channel 131 is not essential but may be selectively formed. The channel 131 may be formed using Si, germanium (Ge), or SiGe. The well layer 132 may be doped with N− type impurities when the single transistor is a PMOS transistor and it may be doped with P− type impurities when the single transistor is an NMOS transistor.

The photodiode 133 may be formed in the well layer 132. The photodiode 133 may be doped with N type impurities when the single transistor is a PMOS transistor and it may be doped with P type impurities when the single transistor is an NMOS transistor.

The gate insulating layer 134 may be formed for insulation between the gate G and the channel 131. The gate insulating layer 134 may be formed using $SiO_2$, SiON, SiN, $Al_2O_3$, $Si_3N_4$, $Ge_xO_yN_z$, $Ge_xSi_yO_z$, or a high dielectric constant material. The high dielectric constant material may be formed using atomic layer deposition of $HfO_2$, $ZrO_2$, $Al_2O_3$, $Ta_2O_5$, hafnium silicate, zirconium silicate, or a combination thereof.

The first epitaxial layer 135 and the second epitaxial layer 136 may be formed using an epitaxial growth method. When the single transistor is a PMOS transistor, the first and second epitaxial layers 135 and 136 may be doped with P− type and P+ type impurities, respectively. Contrarily, when the single transistor is an NMOS transistor, the first and second epitaxial layers 135 and 136 may be doped with N− type and N+ type impurities, respectively.

Although not shown in FIG. 9, conducting wires for the operation of the cell array 110, i.e., conducting wires for connection with the row driver 160 and the readout block 190 may be formed on the source S, the gate G, and the drain to apply back side illumination (BSI) increasing the light guiding efficiency of the photodiode 133.

Figure 10:
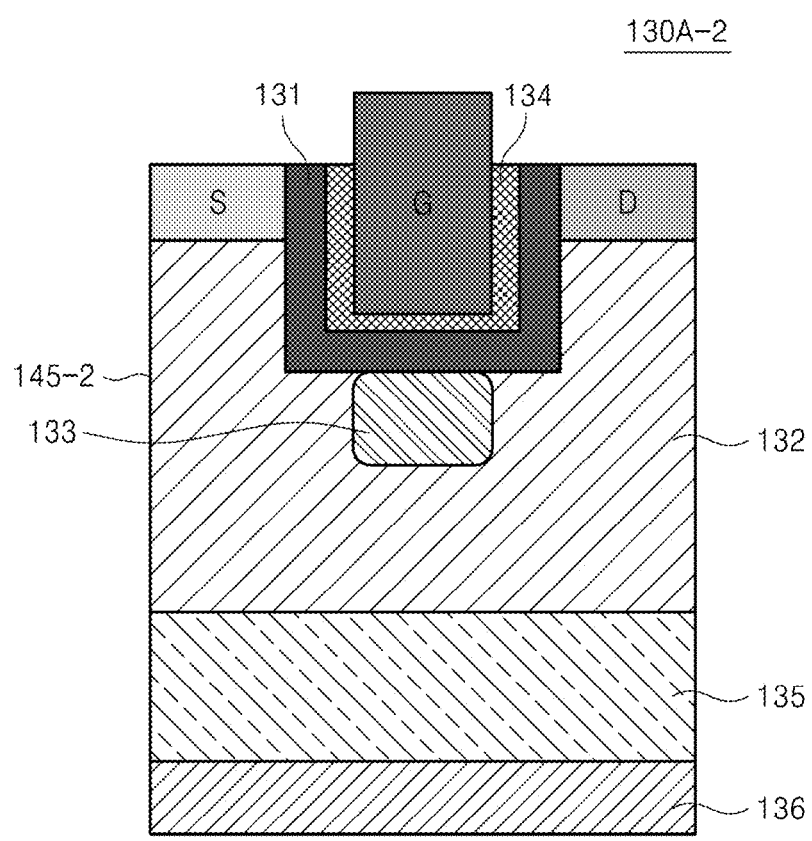
FIG. 10 is a diagram of a cross-section of a semiconductor substrate taken along the direction A in the layout illustrated in FIG. 8 according to another example embodiment of inventive concepts.

FIG. 10 is a diagram of a cross-section 130A-2 of a semiconductor substrate 145-2 taken along the direction A in the layout 130' illustrated in FIG. 8 according to another example embodiment of inventive concepts. Referring to FIGS. 8 through 10, the gate G may be embedded in the semiconductor substrate 145-2 using an etching process in the cross-section 130A-2. In other words, the semiconductor substrate 145-2 may have a recess gate structure.

Accordingly, the channel 131 is also embedded in the semiconductor substrate 145-2, so that the photodiode 133 is formed within the semiconductor substrate 145-2. Therefore, the distance from the photodiode 133 to the source S or the drain D increases. When the distance between the photodiode 133 and the source S or the drain D increases, the influence of the photodiode 133 to the channel 131 may also be increased.

In a microscopic pixel structure in which the length of the gate G is 50 nm or less, the distance from the photodiode 133 to the source S or the drain D is very close, obstructing the smooth operation of the single transistor. In other words, when the length of the gate G is 50 nm or less, the distance between the photodiode 133 and the source S or the drain D is so close that the influence of the photodiode 133 to the channel 131 decreases. As a result, a pixel signal dull to the photogenerated charges accumulated in the photodiode 133 may be generated. Therefore, when the image sensor 100 is implemented using microscopic pixels, it is preferable to form the cell array 110 in the recess gate structure.

Except for the above-described differences, the semiconductor substrate 145-2 illustrated in FIG. 10 is substantially the same as the semiconductor substrate 145-1 illustrated in FIG. 9.

Figure 11:
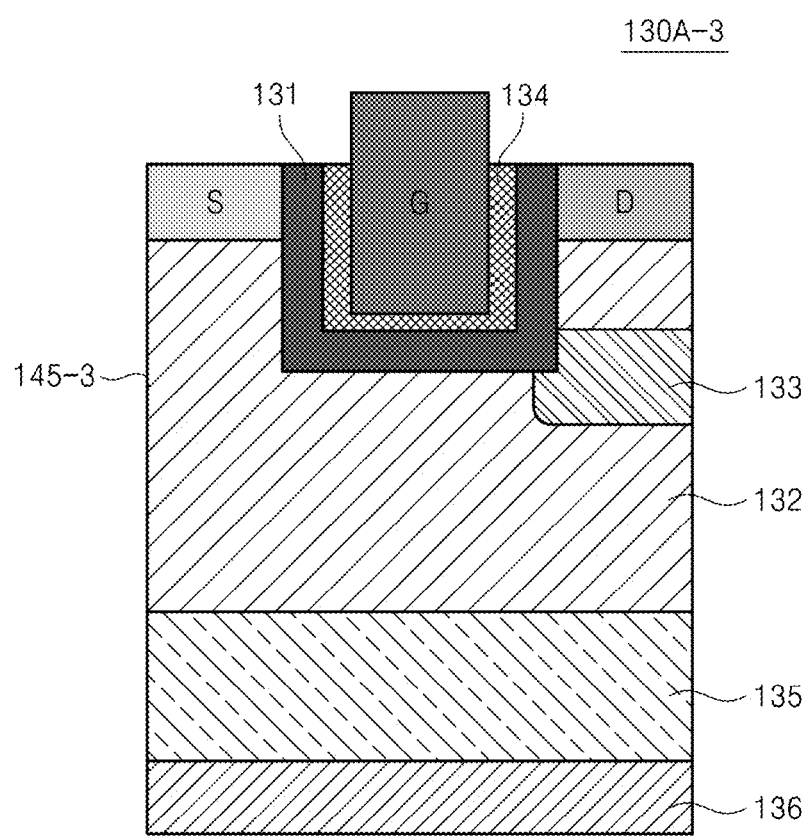
FIG. 11 is a diagram of a cross-section of a semiconductor substrate taken along the direction A in the layout illustrated in FIG. 8 according to another example embodiment of inventive concepts.

FIG. 11 is a diagram of a cross-section 130A-3 of a semiconductor substrate 145-3 taken along the direction A in the layout 130' illustrated in FIG. 8 according to another example embodiment of inventive concepts. Referring to FIGS. 8 through 11, the gate G in the cross-section 130A-3 may be formed in the recess gate structure as in the cross-section 130A-2 illustrated in FIG. 10.

The photodiode 133 may be formed closer to the drain D than to the source S around the gate G. In other words, the photodiode 133 may be formed in an asymmetric structure with respect to the gate G. In other embodiments, the photodiode 133 may be formed closer to the source S than to the drain D.

When the photodiode 133 is formed as shown in FIG. 11, the entire size of the photodiode 133 may be decreased. When the entire size of the photodiode 133 decreases, the distance between photogenerated charges accumulated in the photodiode 133 and the channel 131 also decreases, and therefore, the influence of the photodiode 133 to the channel 131 increases according to Coulomb's law.

In particular, the recess gate structure in which the photodiode 133 is formed asymmetrically with respect to the gate G as shown in FIG. 11 in the microscopic pixel structure having the gate G 32 nm or less in length may have higher photoelectric conversion gain (mV/e−) and higher resistance change (%/e−) than the simple recess gate structure illustrated in FIG. 10. For instance, in the microscopic pixel structure in which the length of the gate G is 22 nm, a single photogenerated charge may generate a conversion voltage of about 60 mV and a resistance change of about 18%.

Figure 12:
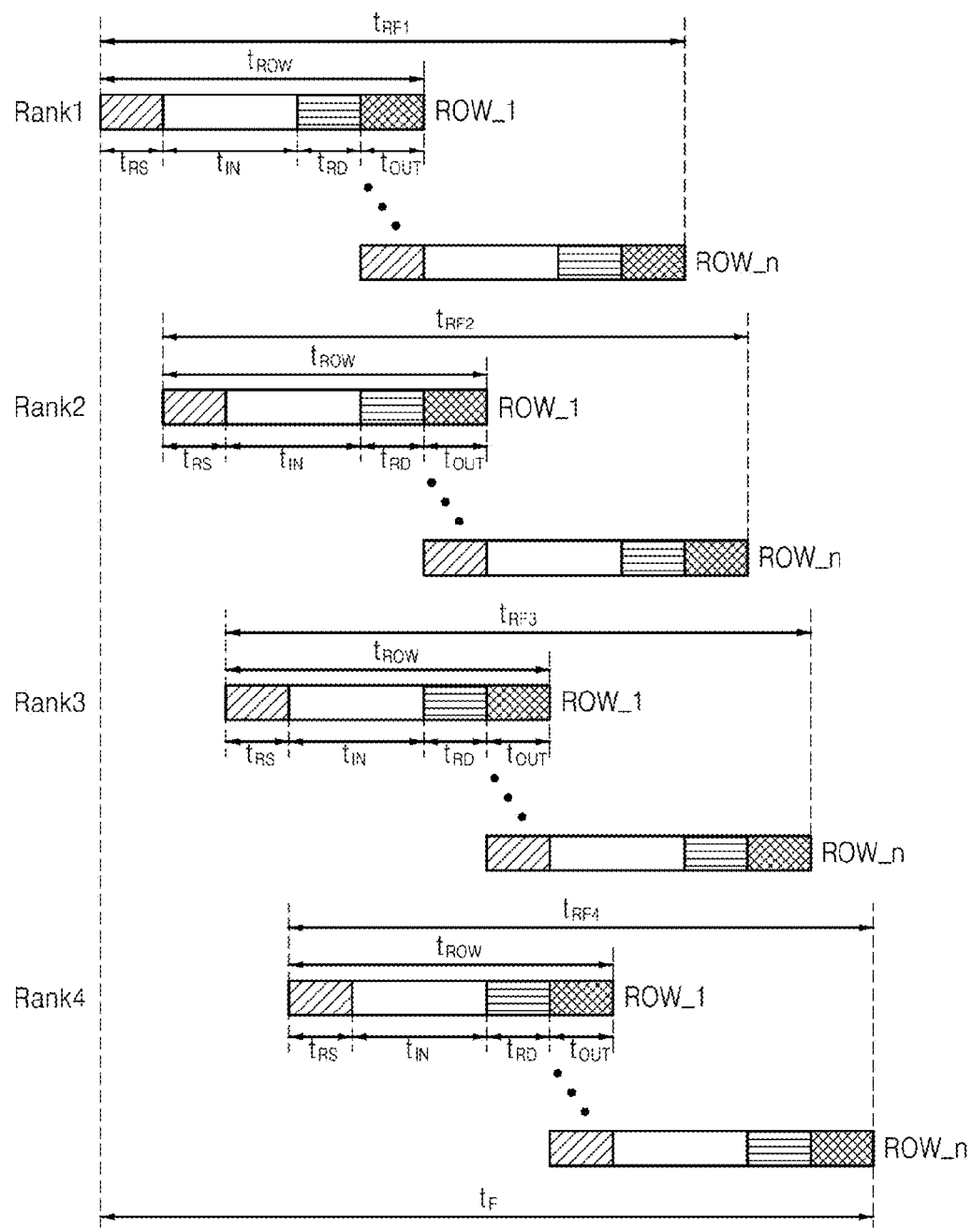
FIG. 12 is a diagram of example timing with which the image sensor illustrated in FIG. 2 is controlled by ranks.

FIG. 12 is a diagram illustrating example timing with which the image sensor 100 illustrated in FIG. 2 is controlled by ranks or groups. Referring to FIGS. 1 through 4 and FIGS. 7 and 12, the reset operation, the integration operation, the readout operation of the readout circuit 600, and the output operation of the output circuit 700 may be sequentially performed on a first row ROW_1 of the first rank Rank1. Times taken to perform the respective operations may be referred to as a reset time $t_{RS}$, an integration time $t_{IN}$, a readout time $t_{RD}$, and an output time $t_{OUT}$, respectively. The sum of the reset time $t_{RS}$, the integration time $t_{IN}$, the readout time $t_{RD}$, and the output time $t_{OUT}$ may be defined as a row sensing time $t_{ROW}$. It is assumed that the row sensing time $t_{ROW}$ is the same for the rows in each of the ranks Rank1 through Rank4.

A time taken for all rows ROW_1 through ROW_n in the first rank Rank1 to be completely sensed once may be defined as a first rank frame time $t_{RF1}$. In the same manner, a second rank frame time $t_{RF2}$, a third rank frame time $t_{RF3}$, and a fourth rank frame time $t_{RF4}$ may be defined for the second through fourth ranks Rank2 through Rank4, respectively. In addition, a time taken for all rows ROW_1 through ROW_n in the all ranks Rank1 through Rank4 to be completely sensed once may be defined as a frame time $t_F$.

Since the row driver 160 independently controls each rank in the cell array 110 as described above, the first through fourth rank frame times $t_{RF1}$ through $t_{RF4}$ overlap one another, and therefore, the frame time $t_F$ may be shorter than when the cell array 110 is controlled only by rows. As a result, the operating speed of the image sensor 100 is increased.

Figure 13:
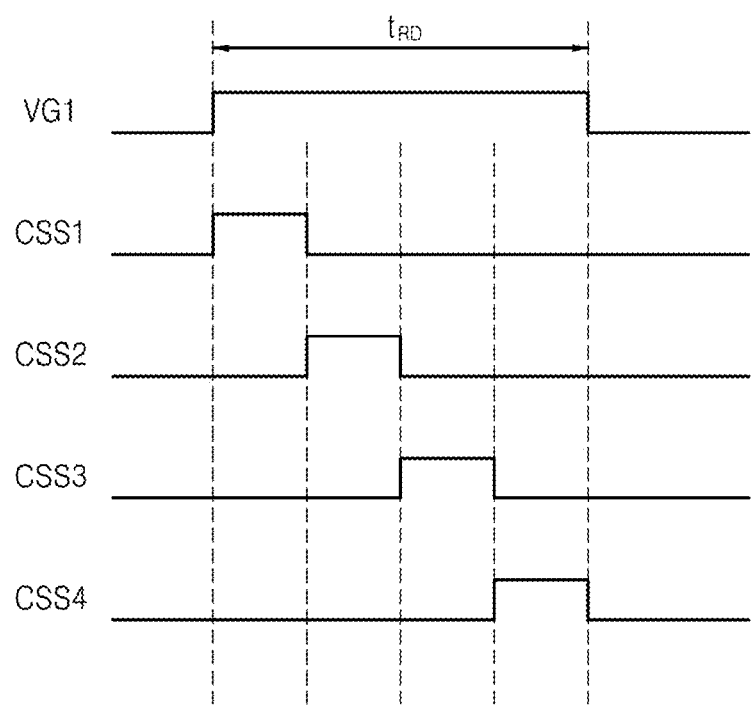
FIG. 13 is a timing chart for explaining an example embodiment of an addressing method during a readout time illustrated in FIG. 12.

FIG. 13 is a timing chart for explaining another example embodiment of an addressing method during the readout time $t_{RD}$ illustrated in FIG. 12. Referring to FIGS. 1 through 5 and FIGS. 7, 12, and 13, FIG. 13 illustrates signals applied to a first row of the first rank Rank1-1 illustrated in FIG. 3 or Rank1-2 illustrated in FIG. 4.

The first gate signal VG1 applied to the first row ROW_1 of the first rank Rank1-1 or Rank1-2 may control pixels in the first row ROW_1 of the first rank Rank1-1 or Rank1-2 to output a pixel signal during the readout time $t_{RD}$. Column signals respectively applied to the sub-readout circuits 620-1 or 620-2 respectively connected to the column lines COL1 through COL4 are defined as first through fourth column selection signals CSS1 through CSS4, respectively. The first through fourth column selection signals CSS1 through CSS4 may control the sub-readout circuits 620-1 or 620-2 to perform the readout operation sequentially starting from the sub-readout circuit 620-1 or 620-2 connected to the first column line COL1. The high level periods of the respective first through fourth column selection signals CSS1 through CSS4 do not overlap one another so that the first through third reference currents Iref1 through Iref3 provided from the reference current circuit 610-1 or 610-2 are applied to only one of the sub-readout circuits 620-1 or 620-2.

Although the signals applied to only the first row ROW_1 of the first rank Rank1-1 or Rank1-2 have been described, it will be apparent that substantially the same addressing method can applied to the other rows.

According to some embodiments of the inventive concept, an image sensor senses a current output from a 1T pixel, thereby reducing the influence of noise and precisely sensing a pixel signal. In addition, the image sensor controls a cell array by ranks, thereby reducing a sensing time for a single frame.

Figure 14:
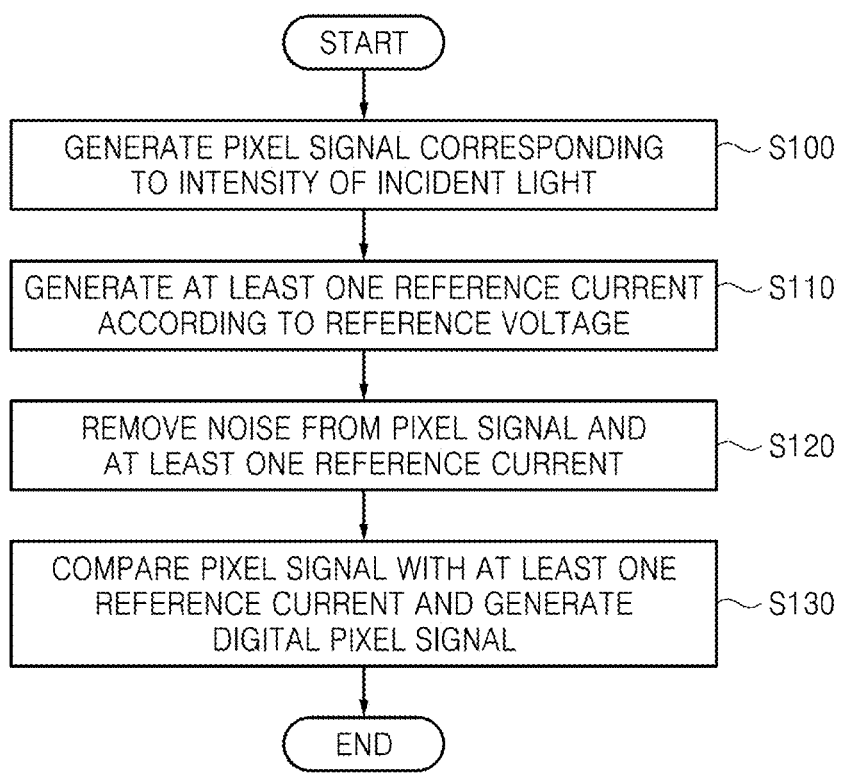
FIG. 14 is a flowchart illustrating an example embodiment of a method of operating the image sensor illustrated in FIG. 1.
Figure 15:
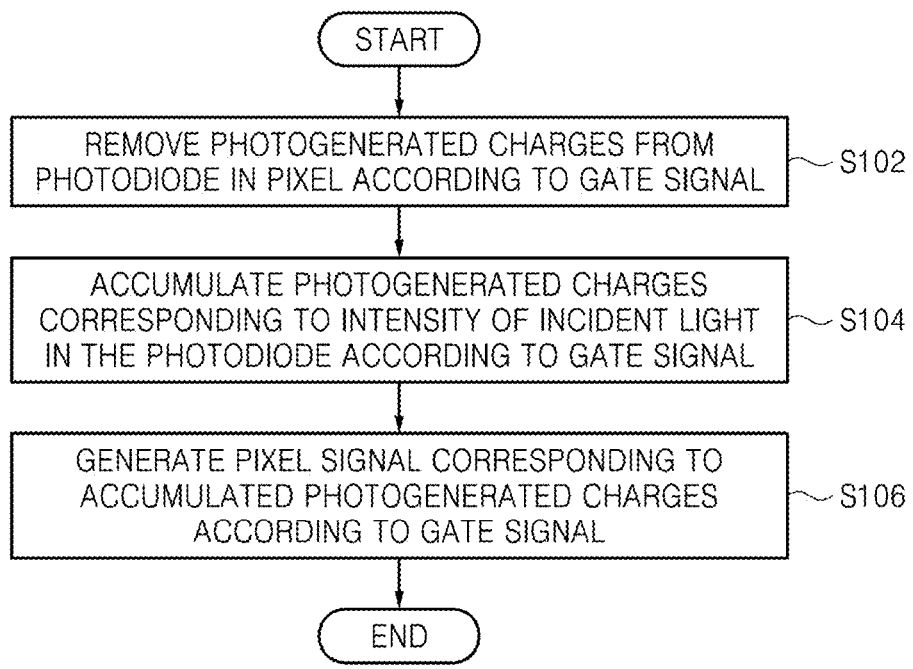
FIG. 15 is a detailed flowchart illustrating an example method of generating a pixel signal in the method illustrated in FIG. 14.
Figure 16:
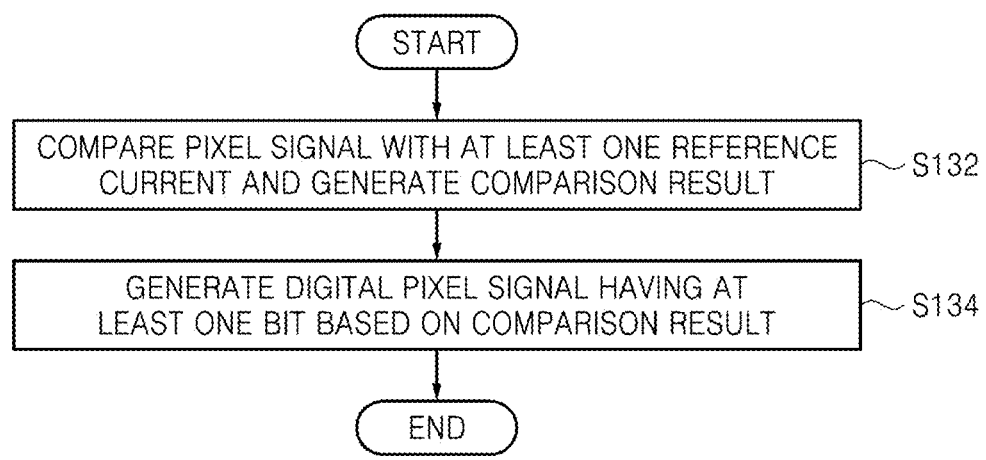
FIG. 16 is a detailed flowchart illustrating an example method of generating a digital pixel signal in the operation illustrated in FIG. 14.

FIG. 14 is a flowchart illustrating an example embodiment of a method of operating the image sensor 100 illustrated in FIG. 1. FIG. 15 is a detailed flowchart illustrating an example embodiment of a method of generating a pixel signal in the method illustrated in FIG. 14. FIG. 16 is a detailed flowchart illustrating an example embodiment of a method of generating the digital pixel signal DPS in the operation illustrated in FIG. 14.

Referring to FIGS. 1 through 4 and FIGS. 7 and 14, each pixel 130-1 or 130-2 included in the cell array 110 may generate a pixel signal, e.g., PS_COL1 corresponding to the intensity of incident light in operation S100. Each reference cell 140-1 or 140-2 included in the cell array 110 may generate one or more reference currents Iref1 through Iref3 according to the reference voltage Vref or the reference voltages Vref1 through Vref3 in operation S110.

The readout circuit 600-1 or 600-2 may remove noise from the reference currents Iref1 through Iref3 and the pixel signal PS_COL1 in operation S120. The readout circuit 600-1 or 600-2 may compare the reference currents Iref1 through Iref3 with the pixel signal PS_COL1 and generate the digital pixel signal DPS in operation S130.

Operation S100 may include operations S102 through S106 illustrated in FIG. 15. The pixel 130-1 or 130-2 may remove photogenerated charges from the photodiode PD according to the gate signal, e.g., VG1 in operation S102. The pixel 130-1 or 130-2 may accumulate photogenerated charges corresponding to the intensity of the incident light in the photodiode PD according to the gate signal VG1 in operation S104. The pixel 130-1 or 130-2 may generate the pixel signal PS_COL1 corresponding to the accumulated photogenerated charges according to the gate signal VG1 in operation S106.

Operation S130 may include operations S132 and S134 illustrated in FIG. 16. The readout circuit 600-1 or 600-2 may compare the reference currents Iref1 through Iref3 with the pixel signal PS_COL1 and generate comparison results, i.e., the comparison signals COMP1 through COMP3 in operation S132. The readout circuit 600-1 or 600-2 may perform decoding based on the comparison signals COMP1 through COMP3 to generate the digital pixel signal DPS having one or more bits, e.g., MSB and LSB in operation S134.

Figure 17:
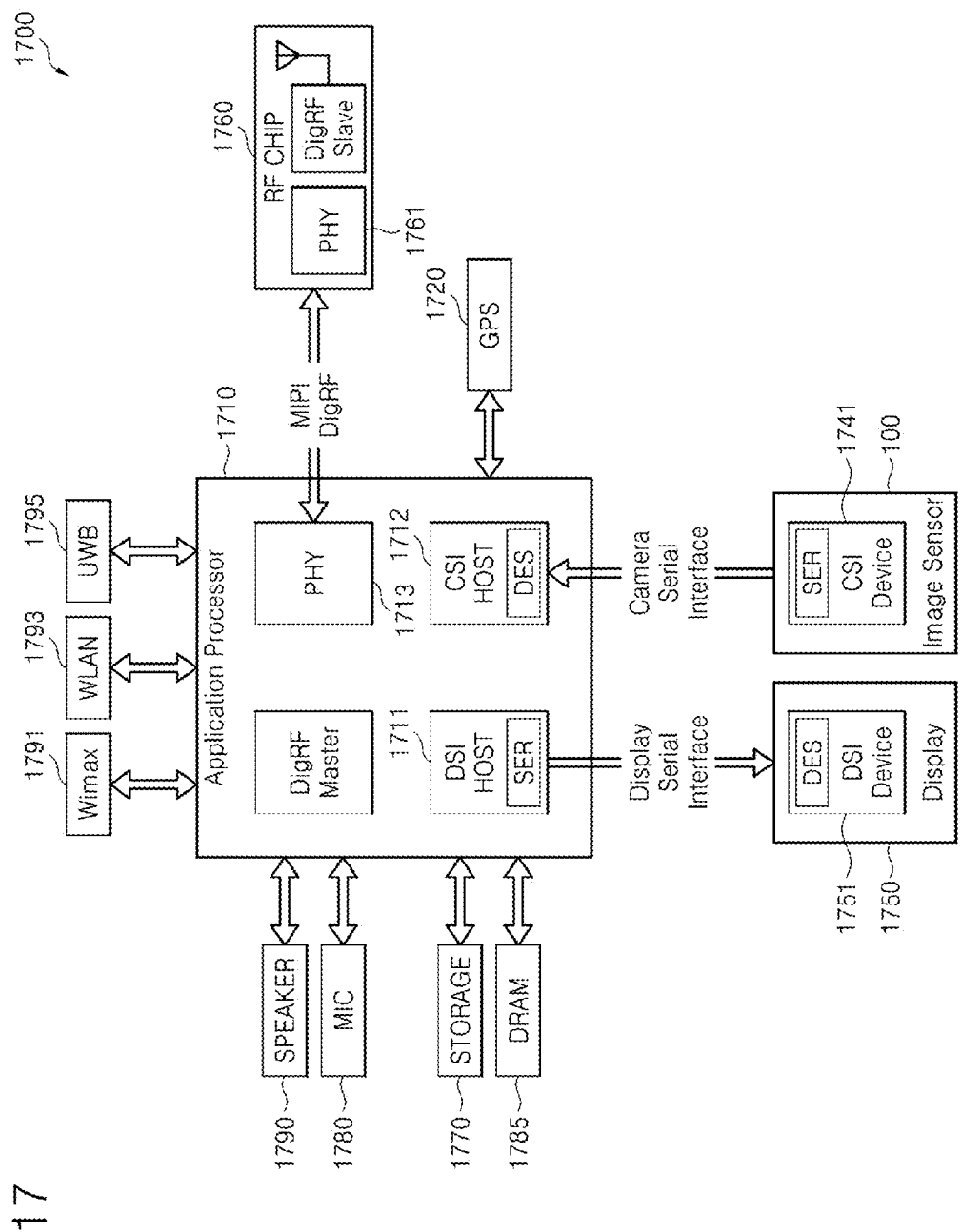
FIG. 17 is a block diagram of an electronic system including the image sensor illustrated in FIG. 1 according to an example embodiment of inventive concepts.

FIG. 17 is a block diagram of an electronic system 1700 including the image sensor 100 illustrated in FIG. 1 according to an example embodiment of inventive concepts.

Referring to FIGS. 1 and 17, the electronic system 1700 may be implemented by a data processing apparatus, such as a mobile phone, a personal digital assistant (PDA), a portable media player (PMP), an IP TV, or a smart phone that can use or support the MIPI interface.

The electronic system 1700 includes an image sensor 100, an application processor 1710, and a display 1750.

A camera serial interface (CSI) host 1712 included in the application processor 1710 performs serial communication with a CSI device 1741 included in the image sensor 100 through CSI. For example, an optical de-serializer (DES)

may be implemented in the CSI host 1712, and an optical serializer (SER) may be implemented in the CSI device 1741.

A display serial interface (DSI) host 1711 included in the application processor 1710 performs serial communication with a DSI device 1751 included in the display 1750 through DSI. For example, an optical serializer may be implemented in the DSI host 1711, and an optical de-serializer may be implemented in the DSI device 1751.

The electronic system 1700 may also include a radio frequency (RF) chip 1760 which communicates with the application processor 1710. A physical layer (PHY) 1713 of the electronic system 1700 and a PHY of the RF chip 1760 communicate data with each other according to a MIPI DigRF standard. The electronic system 1700 may further include at least one element among a GPS 1720, a storage device 1770, a microphone 1780, a DRAM 1785 and a speaker 1790. The electronic system 1700 may communicate using Wimax ((world interoperability for microwave access) 1791, WLAN (wireless local area network) 1100 or USB (ultra wideband) 1110, etc.

Figure 18:
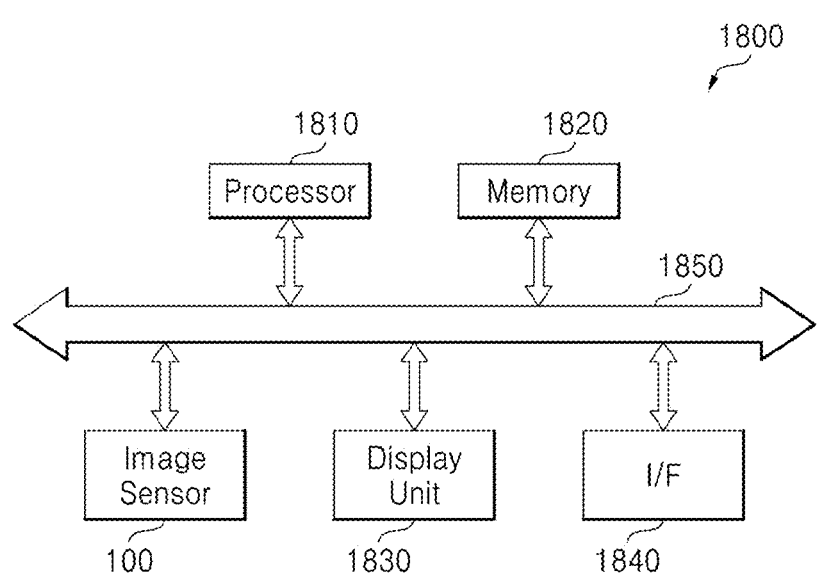
FIG. 18 is a block diagram of an electronic system including the image sensor illustrated in FIG. 1 according to another example embodiment of inventive concepts.

FIG. 18 is a block diagram of an electronic system 1800 including the image sensor 100 illustrated in FIG. 1 according to another example embodiment of inventive concepts. Referring to FIGS. 1 and 18, the electronic system 1800 may include the image sensor 100, a processor 1810, a memory 1820, a display unit 1830, and an interface (I/F) 1840.

The processor 1810 may control the operation of the image sensor 100. For instance, the processor 1810 may process pixel signals output from the image sensor 100 to generate image data.

The memory 1820 may store a program for controlling the operation of the image sensor 100 and the image data generated by the processor 1810. The processor 1810 may execute the program stored in the memory 1820. The memory 1820 may be implemented by a volatile or non-volatile memory.

The display unit 1830 may display the image data output from the processor 1810 or the memory 1820. The display unit 1830 may be a liquid crystal display (LCD), a light emitting diode (LED) display, organic LED (OLED) display, an active matrix OLED (AMOLED) display, or a flexible display.

The I/F 1840 may be implemented to input and output image data. The I/F 1840 may be implemented as a wireless interface.

Inventive concepts may also be embodied as computer-readable codes on a computer-readable medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices.

The computer-readable recording medium can also be distributed over network coupled computer systems so that the computer-readable code is stored and executed in a distributed fashion. Also, functional programs, codes, and code segments to accomplish the present general inventive concept can be easily construed by programmers.

As described above, according to at least some example embodiments of inventive concepts, a current output from a 1T pixel in an image sensor is sensed, so that the influence of noise is reduced and a pixel signal is sensed more precisely. In addition, a cell array in the image sensor is controlled by ranks, so that a sensing time for a frame is reduced.

While inventive concepts have been particularly shown and described with reference to example embodiments thereof, it will be understood by those of ordinary skill in the art that various changes in forms and details may be made therein without departing from the spirit and scope of inventive concepts as defined by the following claims.

What is claimed is:

1. A method of operating an image sensor, the method comprising:
generating a pixel signal according to an intensity of incident light; and
generating a digital pixel signal based on a comparison between the pixel signal and each of a plurality of reference currents, the plurality of reference currents being generated based on a plurality of different reference voltages.

2. The method of claim 1, wherein the generating the digital pixel signal comprises:
comparing the pixel signal with the plurality of reference currents; and
generating the digital pixel signal based on a result of the comparison, the digital pixel signal having at least one bit.

3. The method of claim 1, further comprising:
removing noise from the pixel signal and the plurality of reference currents.

4. The method of claim 1, wherein the generating the pixel signal comprises:
removing photogenerated charges from a photodiode;
accumulating photogenerated charges corresponding to the intensity of the incident light on the photodiode; and
generating the pixel signal corresponding to the accumulated photogenerated charges.

5. An image sensor comprising:
a cell array including a plurality of pixels and a plurality of reference cells, each of the plurality of pixels being configured to generate a pixel signal according to intensity of incident light, and the plurality of reference cells being configured to generate a plurality of reference currents according to a plurality of different reference voltages; and
a readout block configured to compare the pixel signal with the plurality of the reference currents generated by the plurality of reference cells, and to generate a digital pixel signal based on a result of the comparison.

6. The image sensor of claim 5, wherein each of the plurality of pixels comprises:
a single transistor and a photodiode.

7. The image sensor of claim 6, wherein each of the plurality of pixels is configured to,
remove photogenerated charges from the photodiode,
accumulate photogenerated charges corresponding to the intensity of the incident light on the photodiode, and
generate the pixel signal corresponding to the accumulated photogenerated charges.

8. The image sensor of claim 5, wherein each of the plurality of reference cells does not include a photodiode.

9. The image sensor of claim 5, further comprising:
a row driver configured to generate a gate signal and the plurality of different reference voltages to control an operation of the cell array.

10. The image sensor of claim 5, wherein the cell array further comprises:
a plurality of ranks, each of the plurality of ranks including a portion of the plurality of pixels.

11. The image sensor of claim 10, wherein the plurality of ranks are controlled independently of each other according to different gate signals.

12. The image sensor of claim 10, wherein the plurality of reference cells correspond to one of the plurality of ranks.

13. The image sensor of claim 12, wherein the plurality of reference cells corresponding to one of the plurality of ranks receive the plurality of different reference voltages.

14. The image sensor of claim 5, wherein the readout block comprises:
a readout circuit configured to compare the pixel signal with the plurality of reference currents, and to generate the digital pixel signal based on a result of the comparison; and
an output circuit configured to temporarily store, amplify and output the digital pixel signal.

15. The image sensor of claim 14, wherein the readout circuit comprises:
a plurality of sub-readout circuits, each of the plurality of sub-readout circuits corresponding to a column of the cell array, and each of the plurality of sub-readout circuits being configured to be activated according to a corresponding column selection signal; and
a reference current circuit configured to remove noise from the plurality of reference currents, and to output the plurality of reference currents to the readout circuits.

16. The image sensor of claim 15, wherein each of the plurality of sub-readout circuits comprises:
a switching block configured to control a flow of the pixel signal and the plurality of reference currents according to the corresponding column selection signal;
a comparison block configured to compare the pixel signal with the plurality of reference currents, and to generate a digital comparison signal; and
a decoding block configured to generate the digital pixel signal based on the digital comparison signal, the digital pixel signal having at least one bit.

17. The image sensor of claim 16, wherein each of the plurality of sub-readout circuits further comprises:
a replica block configured to replicate the pixel signal to generate at least one replica pixel signal.

18. The image sensor of claim 14, further comprising:
a column driver configured to generate a column selection signal for controlling an operation of the readout block; and
a timing generator configured to control an operation of the column driver.

19. An image processing system comprising:
an image sensor configured to compare a pixel signal with a plurality of reference currents, and to generate a digital pixel signal based on a result of the comparison, the pixel signal being generated according to intensity of incident light, and the plurality of reference currents being generated according to a plurality of different reference voltages; and
an image signal processor configured to generate image data by processing the digital pixel signal.

20. The image processing system of claim 19, wherein the image sensor comprises:
a plurality of pixels, each of the plurality of pixels being configured to generate a corresponding pixel signal; and
a plurality of reference cells, each of the plurality of reference cells being configured to generate a reference current among the plurality of reference currents.

21. The image processing system of claim 20, wherein each of the plurality of pixels comprises:
a single transistor and a photodiode.

22. The image processing system of claim 20, wherein each of the plurality of reference cells does not include a photodiode.

23. An image sensor comprising:
a cell array including a plurality of pixels configured to generate pixel signals based on intensity of incident light, the plurality of pixels being arranged in a plurality of rows and a plurality of columns, the plurality of columns of pixels being organized into a plurality of groups of adjacent columns of pixels, each of the plurality of groups of adjacent columns of pixels being controlled independently from each other based on respective sets of row control signals; and
a readout block configured to generate a digital pixel signal corresponding to each pixel signal based on comparisons between the pixel signals and a plurality of reference currents, the plurality of reference currents being generated based on a plurality of different reference voltages.

24. The image sensor of claim 23, wherein the readout block comprises:
a readout circuit including,
a reference current circuit configured to remove noise from the plurality of reference currents, and output the plurality of reference currents,
a plurality of sub-readout circuits, each of the plurality of sub-readout circuits corresponding to a group of adjacent columns from among the plurality of groups of adjacent columns, and each of the plurality of sub-readout circuits being configured to generate a digital pixel signal based on a comparison between the plurality of reference currents and a pixel signal output from a column among a corresponding group of adjacent columns.

25. The image sensor of claim 23, wherein each of the plurality of pixels comprises:
a single transistor and a photodiode.

* * * * *